United States Patent
Murata (10) Patent No.: US 8,655,614 B2
(45) Date of Patent: Feb. 18, 2014

(54) POSITION ONLY FIT, POF, ALGORITHM FOR BLUR SPOT TARGET TRACKING AND DISCRIMINATION

(75) Inventor: Ronald N. Murata, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 11/948,132

(22) Filed: Nov. 30, 2007

(65) Prior Publication Data

US 2009/0144003 A1    Jun. 4, 2009

(51) Int. Cl.
*G01R 13/00* (2006.01)
*G06K 9/00* (2006.01)

(52) U.S. Cl.
USPC ............................................ 702/66; 382/103

(58) Field of Classification Search
USPC ................. 702/66, 40, 69, 86, 130, 134–136, 702/94–95, 150–153, 179; 382/181, 190, 382/206, 207, 286, 291, 103, 106, 109, 276, 382/108; 250/341.8, 370.1, 559.29, 559.35, 250/206.1–206.2
See application file for complete search history.

(56) References Cited

U.S. PATENT DOCUMENTS

| | | | |
|---|---|---|---|
| 6,895,102 B2 * | 5/2005 | Lewins et al. | 382/103 |
| 7,236,613 B2 | 6/2007 | Murata | |
| 7,467,061 B2 * | 12/2008 | Satoh et al. | 702/150 |
| 7,516,005 B2 * | 4/2009 | Luo et al. | 701/45 |
| 7,860,344 B1 * | 12/2010 | Fitzpatrick et al. | 382/291 |
| 2005/0045825 A1 * | 3/2005 | Murata | 250/342 |
| 2006/0008144 A1 * | 1/2006 | Prasad et al. | 382/173 |

* cited by examiner

*Primary Examiner* — Sujoy Kundu
*Assistant Examiner* — Ricky Ngon (57) ABSTRACT

A method for determining the amplitude of an infrared object may include receiving an infrared image of the object from a sensor, and expressing the objects infrared amplitude as a function of its position coordinates. The sum of the squared residuals of the objects true infrared response and a model of the objects infrared response may be minimized to determine the centroid of the infrared image. The objects infrared amplitude may then determined based on the centroid location.

18 Claims, 7 Drawing Sheets

$$\text{centroidamp} := \begin{vmatrix} \text{for } FR \in 2..nf \\ \begin{vmatrix} \min \leftarrow 10^{12} \\ \text{for } rtt \in 2.5, 2.6..3.5 \\ \begin{vmatrix} \text{for } ctt \in 2.5, 2.6..3.5 \\ \begin{vmatrix} \text{if } sos(rtt, ctt, FR) < \min \\ \begin{vmatrix} \min \leftarrow sos(rtt, ctt, FR) \\ \text{bestrtt}_{FR} \leftarrow rtt \\ \text{bestctt}_{FR} \leftarrow ctt \\ \text{bestamp}_{FR} \leftarrow 0 \end{vmatrix} \end{vmatrix} \end{vmatrix} \\ \text{bestamp}_{FR} \leftarrow \dfrac{\displaystyle\sum_{r=1}^{nr}\sum_{c=1}^{nc}\left[(\text{arrayac}_{FR})_{r,c} \cdot \text{fitfine}(r, c, \text{bestrtt}_{FR}, \text{bestctt}_{FR})\right]}{\displaystyle\sum_{r=1}^{nr}\sum_{c=1}^{nc} \text{fitfine}(r, c, \text{bestrtt}_{FR}, \text{bestctt}_{FR})^2} \\ \text{three}_{FR} \leftarrow \begin{pmatrix} \text{bestrtt}_{FR} \\ \text{bestctt}_{FR} \\ \text{bestamp}_{FR} \end{pmatrix} \end{vmatrix} \\ \text{three} \end{vmatrix}$$

Object Amplitude Estimates in a 32 Trial Monte Carlo Simulation

Fig. 8

Object Position Estimates in a 32 Trial Monte Carlo Simulation

POSITION ONLY FIT, POF, ALGORITHM FOR BLUR SPOT TARGET TRACKING AND DISCRIMINATION

FIELD OF THE DISCLOSURE

The present disclosure relates to methods and systems for acquiring and tracking infrared objects, and more specifically to analytical methods for determining the amplitude (radiant intensity) and angular position of unresolved infrared objects.

BACKGROUND

The detection of objects using infrared sensors has numerous practical applications. For example, infrared sensors can be used in astronomy to acquire and track objects such as stars, asteroids, and comets. Similarly, infrared sensors can be used to track and control commercial and military aircraft and missiles. Moreover, infrared sensing can be used in the medical field to image small moving objects, such as cells.

Precise estimates of an infrared objects' radiant intensity (amplitude) and the objects' direction (azimuth and elevation angles) are critical to acquiring and tracking these objects.

Although current infrared systems acquire and track infrared objects satisfactorily, room for improvement exists. Specifically, current infrared sensing systems are required to fit three parameters (e.g., amplitude, azimuth, and elevation angles). These iterative curve fitting process are computationally intensive and time consuming to perform. Moreover, current amplitude and position estimation algorithms (e.g., Newton algorithms), which differentially update their initial amplitude and position parameter estimates, can exhibit oscillations in their estimates which can cause false local minimums in their residual functions.

Accordingly, there is a need for improved methods and systems for determining infrared objects' amplitude and position.

SUMMARY

Methods and systems for determining the amplitude (radiant intensity) and position (sub-pixel detector position) of infrared objects are described herein. The methods and systems in accordance with the present disclosure provide the amplitude and sub-pixel position of infrared objects more quickly and efficiently than prior infrared sensing methods and systems by exploiting a transformation of the amplitude parameter in terms of its position parameters.

In one embodiment, a method for determining the amplitude of an infrared object includes receiving an infrared image of the object from a sensor, and expressing the objects infrared amplitude as a function of the objects position coordinates. The method further includes minimizing the sum of the squared residuals of the received infrared image from a model of the received infrared image, the model being expressed as a function of amplitude weighted point spread function of the sensor. Then determining the models' centroid location and determining the infrared amplitude based at least in part on the centroid location.

In an alternate embodiment, a system for determining the infrared amplitude of an object includes an infrared sensor and a processor operatively coupled to the sensor. The processor includes: a first portion adapted to receive an infrared image of the object from the sensor, a second portion adapted to express the amplitude as a function of position coordinates associated with the object, a third portion adapted to minimize the sum of squared residuals of the objects infrared image from a model of the objects infrared image, and a fourth portion adapted to determine a centroid location of the model of the received infrared image, the infrared amplitude is then determined based on the centroid location. In both embodiments the invention transforms the object's amplitude parameter in terms of the object's angular position parameters, thereby reducing the dimension of the parameter unknowns.

Other systems, methods, and/or computer program products according to other embodiments will be or become apparent to one with ordinary skill in the art upon review of the following drawings and detailed description. It is intended that all such additional methods, systems, and/or computer products be included within this description, be within the scope of the present invention, and be protected by the accompanying claims.

BRIEF DESCRIPTIONS OF THE DRAWINGS

The disclosure is made with reference to the accompanying figures. In the figures, the left most reference number identifies the figure in which the reference number first appears. The use of the same reference numbers in different figures indicates similar or identical terms.

DETAILED DESCRIPTION

The present disclosure relates to methods and systems for acquiring and tracking infrared objects, and more specifically to analytical methods for determining the amplitude (radiant intensity—watts per steradian) and position (azimuth and elevation angles—micro-radians) of an infrared object.

The novel analytical method and algorithm solves for the infrared object's amplitude "A" in terms of sub-pixel position coordinates "X" and "Y". The novel position only fitting (POF) algorithm differs from present intensity and position matching algorithms in that the POF algorithm reduces the intensity and position matching procedure to only estimating the infrared objects position (i.e., detector sub-pixel coordinates). Since the infrared amplitude A is determined directly, rather than iteratively, there is a significant reduction of the number of calculations required to determine an object's infrared amplitude and position. Accordingly, the POF algorithm reduces the number of parameters that must be determined, thereby improving the speed and efficiency of calculating an object's infrared amplitude.

All objects emit a certain amount of black body radiation as a function of their temperature. Generally, the higher an objects temperature, the more infrared radiation it emits. Infrared sensors detect this radiation similar to the way in which a digital camera detects visible light. A typical infrared sensor has an optical system which focuses the infrared image on a two dimensional photosensitive detector. The detector converts the infrared energy into an electrical signal which is converted into a temperature value based on the targets emissivity. The brightest (warmest) parts of an image are generally colored white, intermediate temperatures are colored red and yellows, and the coolest parts are colored blue.

Figure 1:
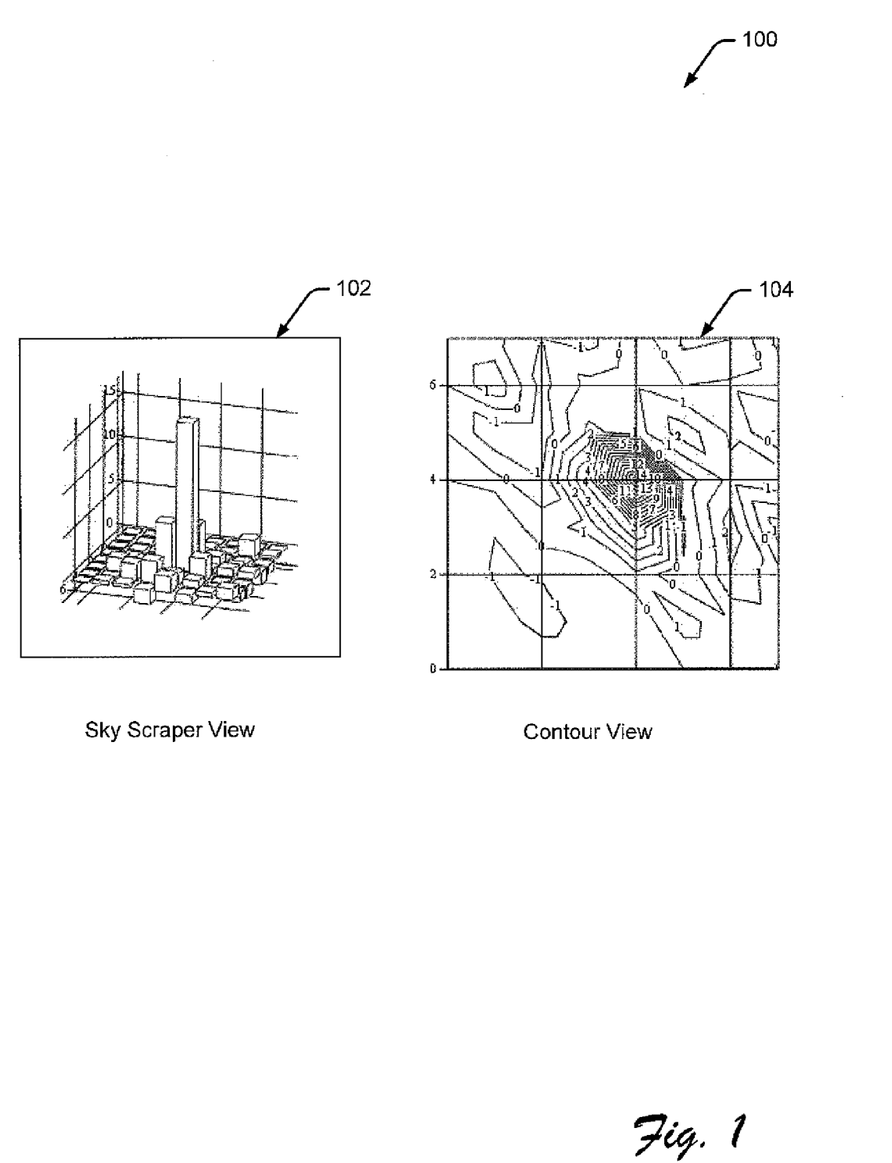
FIG. 1 depicts an illustrative blur spot target that has been detected by an infrared sensor.

FIG. 1 depicts an illustrative blur spot target 100 that has been sampled by a two-dimensional infrared detector array. A blur spot target is a point source object that is spatially unresolved on the detectors focal plane. Blur spot targets appear as fuzzy blurs whose size and shape characteristics are determined by the point spread function (PSF) of the sensors optical system and the motion of the spot. The left view presents the infrared data in a sky scraper view 102, while the right view presents the same data in a contour view 104. The objective is to determine the blur spot's radiometric amplitude A and position coordinates i and j with high sub-pixel accuracy. For example, when an astronomer detects a star or unresolved asteroid with an infrared telescope he must detect the object with precise sub-pixel positional accuracy so that the object can be acquired and tracked at a later date.

Figure 2:
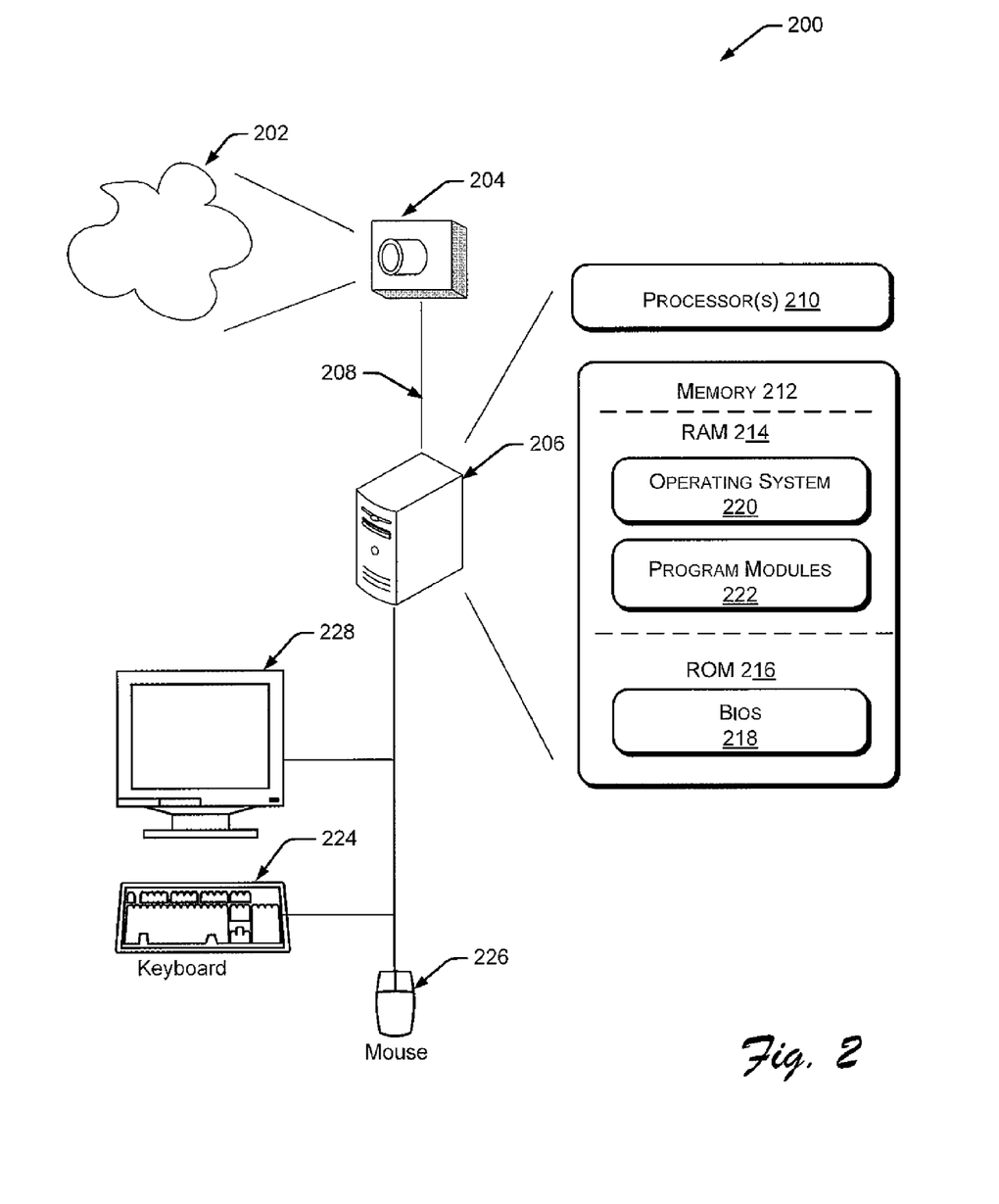
FIG. 2 depicts an illustrative imaging system in accordance with an embodiment

FIG. 2 depicts an imaging system 200 for detecting and resolving infrared objects 202 in accordance with an illustrative embodiment. The system 200 includes an infrared (IR) sensor 204, a computing device 206, and a communications link 208 which operatively couples the IR sensor 204 and the computing device 206.

The sensor 204 detects and receives unresolved infrared (IR) images emitted by various objects 202. The IR sensor 204 may be capable of acquiring both visible and IR images of objects. IR sensors 204 can generally be divided into two types: those with cooled IR image detectors and those with uncooled detectors. Cooled IR detectors are typically contained in an evacuated housing and are cryogenically cooled. This significantly increases the sensors' sensitivity since its temperature is much lower than the object it is sensing. Uncooled IR detectors operate at ambient temperature and sense the change in resistance, voltage, or current when heated by IR radiation being emitted by the object 202. Those changes are then measured and compared to the sensors values when it operates at ambient temperature The illustrative computing device 206 may be a laptop computer, a desktop computer, a work station, a mainframe computer, a network computer, or any other suitable computing device. The computing device 206 includes one or more processors 210 and memory 212. Memory 212 may include any type of suitable computing memory, including volatile memory, such as random access memory (RAM) 214, and non-volatile memory, such as read only memory (ROM) 216. A basic input/output system (BIOS) 218, which contains the basic routines for transferring information between elements of the computing device 206, is stored in ROM 216. The data and/or program modules 222 that are currently being used by the processor(s) 210 are also stored in RAM 214.

The computing device 206 may also include other computer storage media such as a hard drive, a magnetic disk drive (e.g., floppy disks), an optical disk drive (e.g., CD-ROM, DVD, etc.) and other types of computer readable media.

Commands and information can be entered into the computing device 206 via a variety of input devices including: a keyboard 224 and a pointing device (e.g., a mouse) 226. The IR object 202 may be viewed via a monitor 228 or other display device that is connected to the computing device 206 via an interface, such as a video adapter.

In addition, the computing device 206 may operate in a networked computing environment by being coupled to one or more servers (not shown) through a local area network (LAN) or a wide area network (WAN). Such networking environments are commonplace in offices, enterprise-wide computer networks, intranets, and the Internet.

Figure 3:
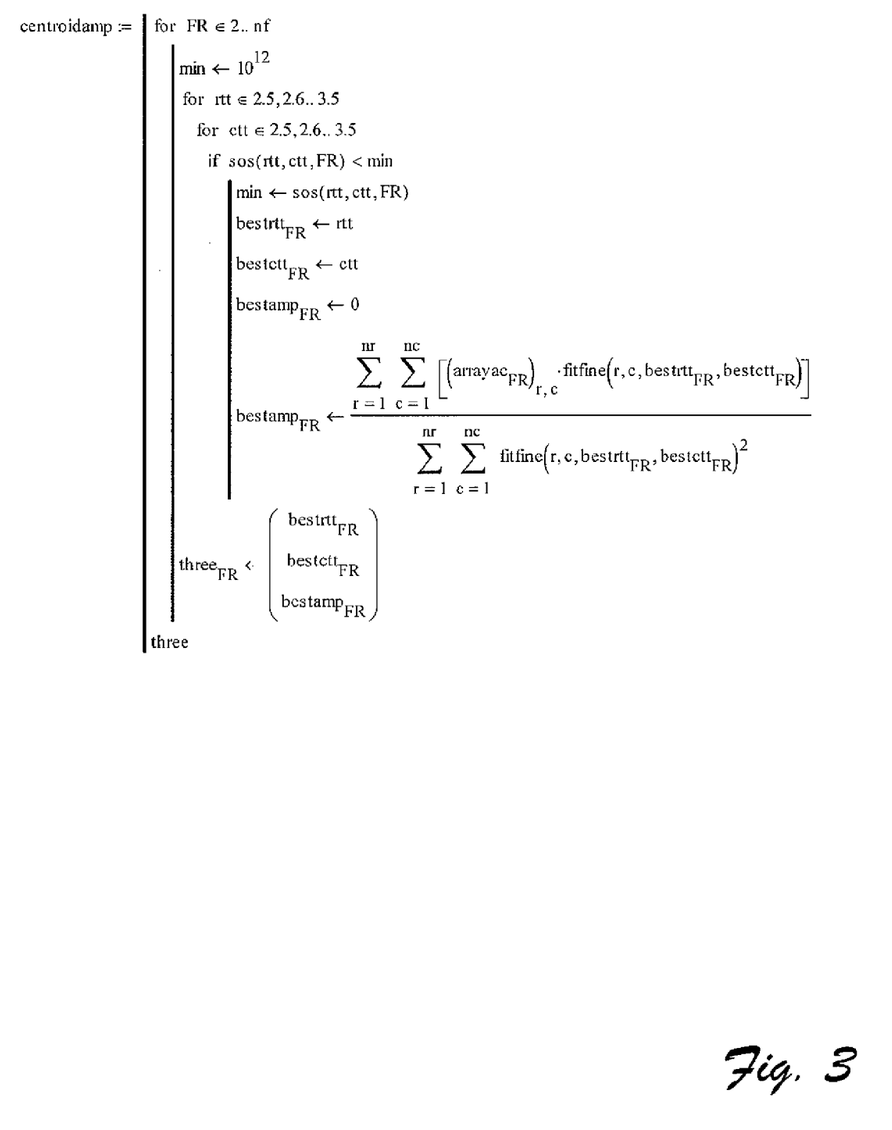
FIG. 3 depicts the POF algorythm being implemented using MATHCAD™ computer code in accordance with an embodiment

FIG. 3 illustrates the POF algorithm as it may be implemented using MATHCAD™ computer code. The first loop initiates a series of Monte Carlo trials in order to perform statistical analyses (i.e., determine the mean and standard deviation of the amplitude and position coordinates). The second and third nested loops perform a sub pixel search to determine the objects' best azimuth and elevation positions. The best amplitude and position is determined when the sum of squared residual SOS is a minimum. It should be appreciated that the POF algorithm could be implemented in other computer codes, programs, routines, objects, components, data structures, etc., without departing from the scope of the disclosure.

Figures 4, 5:
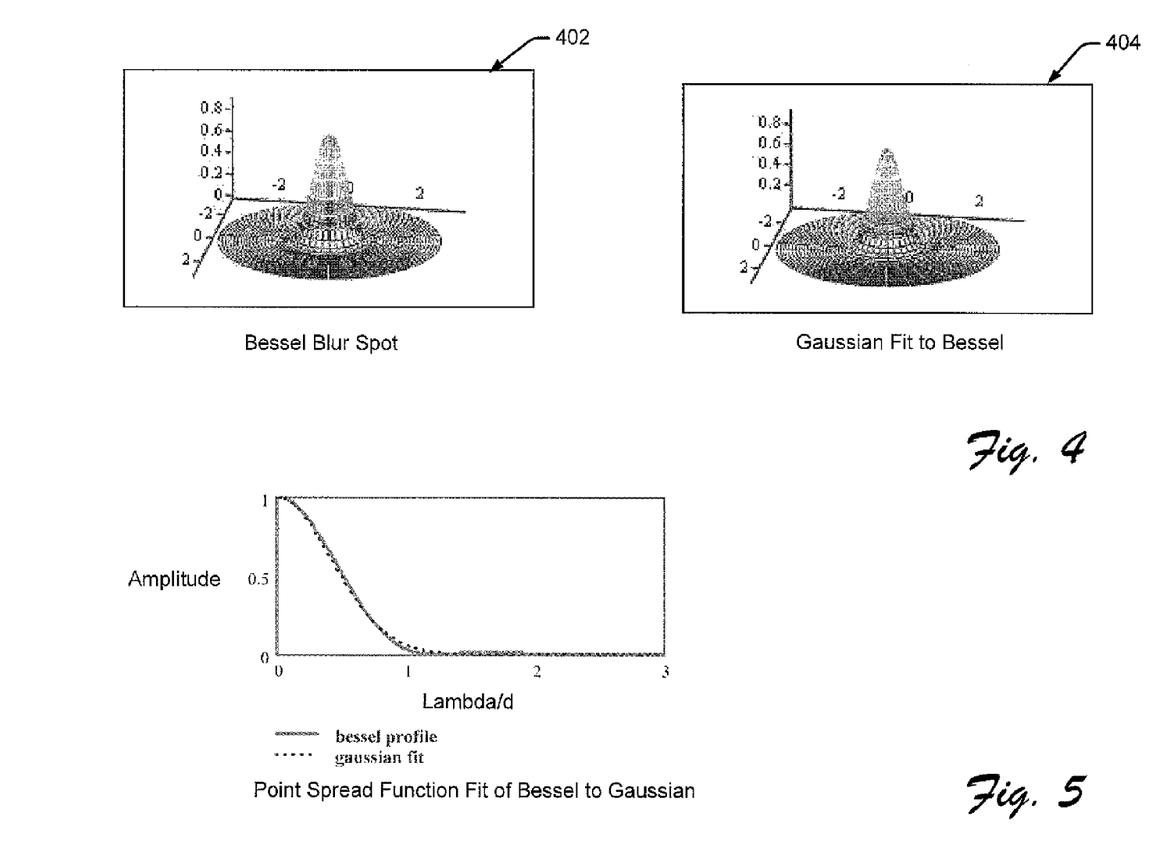
FIG. 4 depicts a pair of illustrative point spread function (PSF) models in accordance with an embodiment.
FIG. 5 depicts an illustrative comparison of a Bessel blur spot model and Gaussian distribution.

Even in ideal IR sensor designs, optical diffraction induces blurring of an object's infrared image. FIG. 4 depicts a pair of illustrative point spread function (PSF) models that may be employed in various embodiments of the invention. Specifically, FIG. 4 shows a Bessel blur spot model 402 and a Gaussian distribution 404 fitted to the Bessel model 402. For unobscured circular aperture optics, the monochromatic Type 1 Bessel function (squared) describes the blurring of an object's IR image. A comparison of the Bessel blur spot model 402 and Gaussian distribution 404 is shown in FIG. 5. As FIG. 5 shows, there is generally good agreement between the two functions for angular values in lambda/d units of less than approximately one. Generally speaking, the resolution of an optical sensor may be proportional to the ratio of lambda/d, where "lambda" is the wavelength of the observed infrared signal, and "d" is the sensors aperture diameter. Accordingly, if the PSF is assumed to be a Gaussian distribution, then:

$$PSF=\exp[-(r^2+c^2)/2/s^2)]/[2*pi*s^2] \quad (1)$$

Where "r" and "c" are the row and column pixels respectfully and "s" is the blur spot's standard deviation in pixel units. The POF algorithms utility, however, is not limited to Gaussian point spread functions.

As noted, the POF algorithm solves for the object's amplitude A in terms of its sub-pixel coordinates i and j, when the object's blur spot point spread function is known. In other words, the object's amplitude A is expressed directly as a function of the detector's position (i.e., i and j detector sub-pixel coordinates). Thus, when the object's sub pixel detector position is known, the amplitude may be calculated using a direct, non-iterative process.

Specifically, expression (2) (below) describes the object's amplitude "A1" as a function of sub-pixel position coordinates "X1" and "Y1". The parameter "f" represents the multiple frames of image data that are analyzed by a Monte Carlo simulation to calculate the mean and standard deviation for the amplitude and position coordinates. The term "vector data$_{ij}$" represents the raw vector data in i and j detector pixel coordinates. The terms "F1x" and "F1y" represent the point spread function (PSF) of the blur spot in row and column pixels. The denominator represents the two-dimensional sum of the point spread function which when divided into the numerator yields the objects amplitude A1.

Expression (3) (below) is the sum of the squared residuals (SOS)

$$A1(X1, Y1, f) := \frac{F1x(i, X1) \cdot F1y(j, Y1)}{\sum_{i=1}^{bed}\sum_{j=1}^{bed} F1x(i, X1) \cdot F1y(j, Y1) \cdot (F1x(i, X1) \cdot F1y(j, Y1))} \sum_{i=1}^{bed}\sum_{j=1}^{bed}(vectordata_f)_{i,j} \cdot \quad (2)$$

$$SOS(X1, Y1, f) := \sum_{i=1}^{bed}\sum_{j=1}^{bed}[(vectordata_f)_{i,j} - A1(X1, Y1, f) \cdot F1x(i, X1) \cdot F1y(j, Y1)]^2 \quad (3)$$

function. The SOS function represents the difference between the objects true IR image (i.e., unresolved sensor data in i and j coordinates), and the POF algorithm's model of the raw image data. The preferred amplitude A is determined by minimizing the sum of the squared residuals (SOS) between the object's true response, as measured by the infrared sensor 204, and the POF algorithm's model of the object's response.

Figure 6:
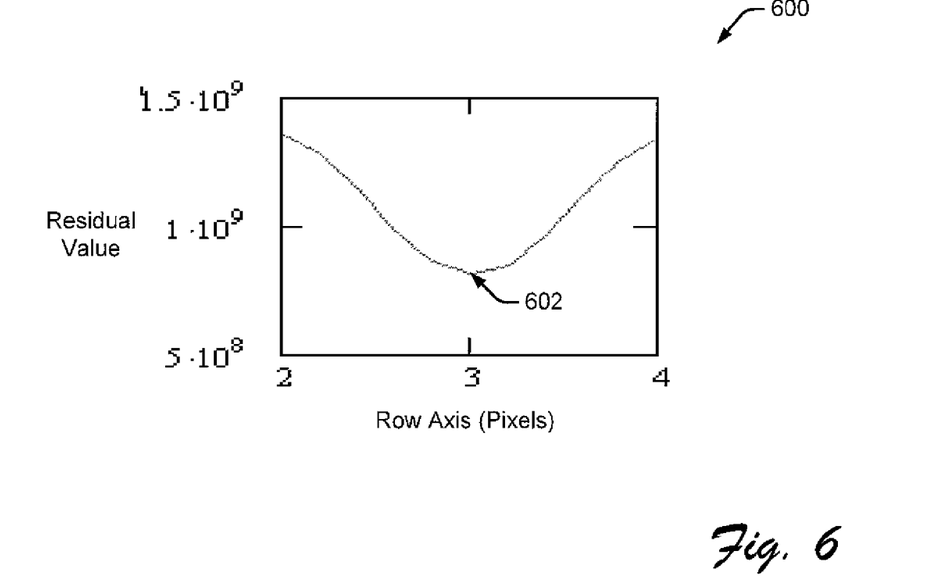
FIG. 6 depicts an illustrative sum of squared residuals (SOS) minimization process in accordance with an embodiment.

For example, FIG. 6 illustrates the SOS minimization process for a typical infrared object 202. The curve 600 depicts the SOS residual value (true response minus modeled response) as a function of the IR sensors row axis (in pixels). The SOS minimum 602 is the lowest point in the curve. In this example, the SOS residual is a minimum at 3.0 pixels. However, the minimum residual 602 could have just as easily occurred at a sub-pixel value (e.g., 2.8 or 3.1 pixels). Once the row axes pixel location is determined, the SOS minimization process may be repeated for the column axis.

Figure 7:
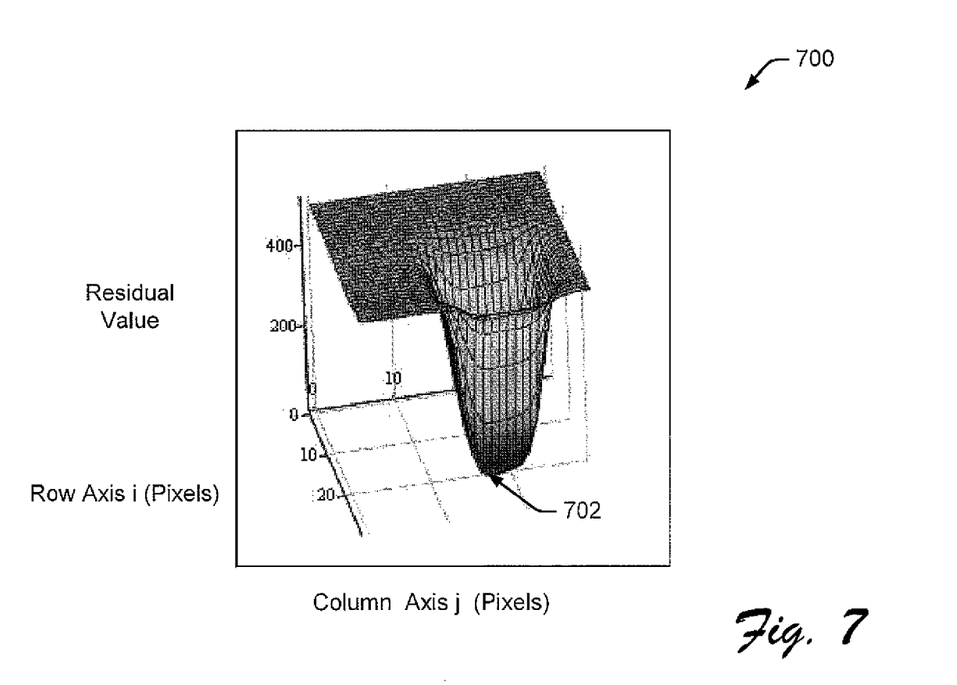
FIG. 7 depicts an illustrative two-dimensional SOS minimization process in accordance with another embodiment.

FIG. 7 illustrates a two-dimensional SOS minimization process 700, again for a typical IR object 202. This illustration is based on the first of 32 Monte Carlo frames. In this example, the minimum SOS 702 occurs at 2.2 row and 1.8 column pixels, and is not centered on a single pixel (e.g., location 3.0, 3.0).

Monte Carlo methods are widely used to simulate the behavior of physical and mathematical systems with a large number of degrees of freedom. Monte Carlo methods are particularly useful for modeling systems with significant input uncertainty, such as radiation fields and energy transport. Accordingly, a Monte Carlo simulation is performed to evaluate the impact of the IR sensor's 204 noise and line of sight jitter on the object's estimated amplitude and location.

Figure 8:
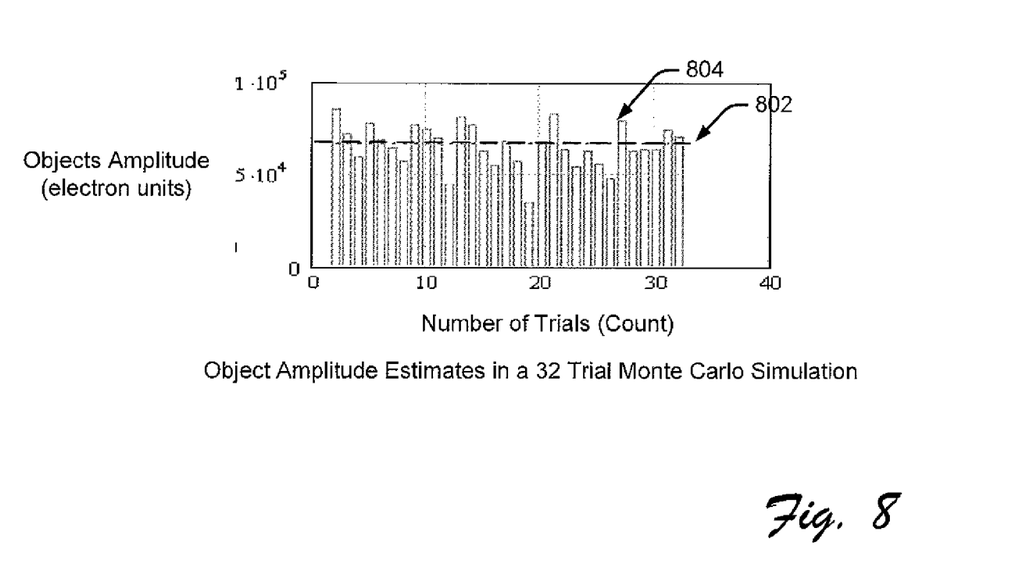
FIG. 8 depicts a series of object amplitude estimates for a 32-trial Monte Carlo simulation.
Figure 9:
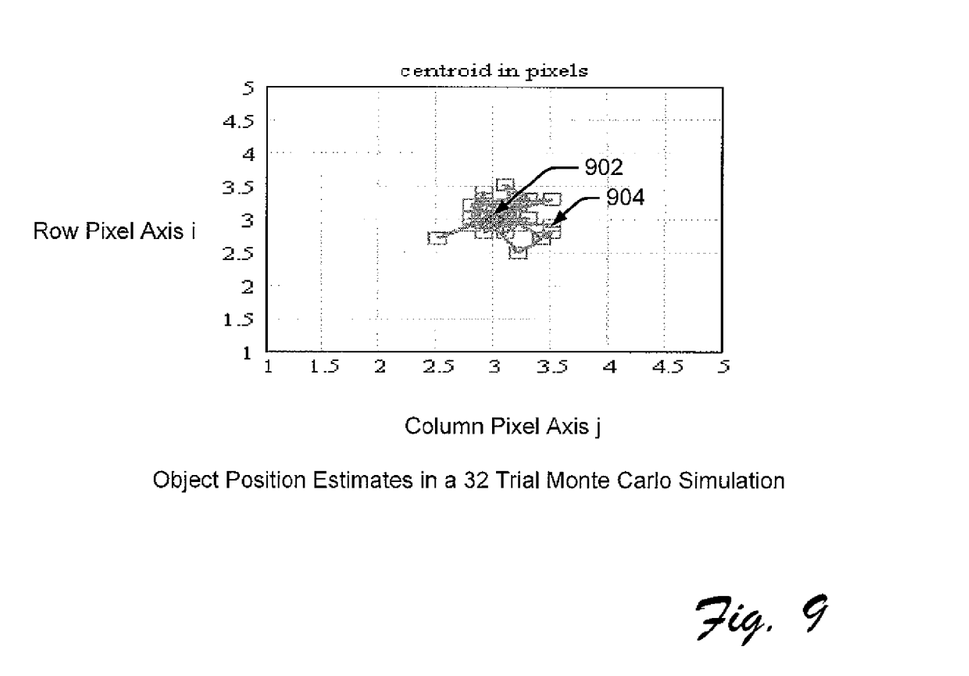
FIG. 9 depicts a series of object position estimates for a 32-trial Monte Carlo simulation.

FIGS. 8 and 9 illustrate a series of amplitudes and pixel coordinates for a 32 trial Monte Carlo simulation. Estimates of the object's amplitude A and pixel coordinates (i and j) are shown along with the objects actual amplitude and position coordinates. In FIG. 8, the object's mean amplitude 802 is illustrated by the dotted line, and the object's estimated amplitudes 804 are shown by the bars. The mean X and standard deviation (SD) of the amplitudes are $8.967 \times 10^4$ and $1.197 \times 10^4$ electrons respectfully; which is close to Cramer Rao noise limited unbiased performance with 0.25 pixel jitter for the background limited noise. In FIG. 9, the object's actual centroid location 902, in the absence of jitter, is indicated by a single diamond icon at row and column location (3.0, 3.0). The objects estimated location 904 is given by the trajectory lines. The object's mean and standard deviation (SD) for the column and row pixel locations are 3.035 and 0.228, and 3.084 and 0.238 respectfully; again close to Cramer Rao performance in jitter.

Figure 10:
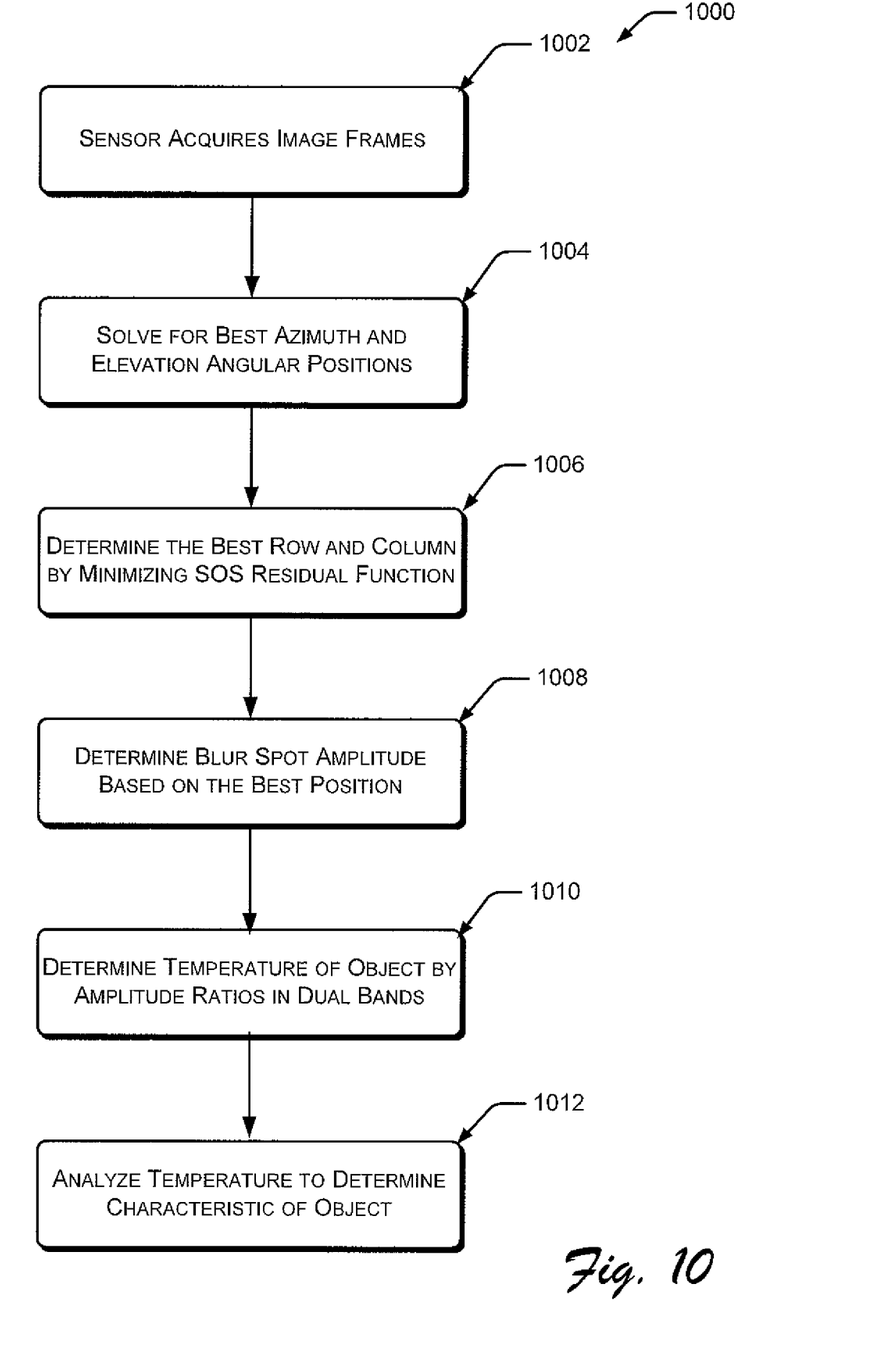
FIG. 10 depicts an illustrative method of determining the amplitude of an infrared object in accordance with a further embodiment.

FIG. 10 depicts an illustrative method 1000 for determining the amplitude A of an IR object 202 in accordance with an embodiment. The IR sensor 204 acquires a series of object image frames "FR", at block 1002. Typically, the sensor 204 acquires 32 or more image frames to ensure that there is at least 95% confidence that the estimated amplitude and position values are reliable. However, the sensor 204 could acquire 64 frames, 128 frames, or any other suitable number of image frames to obtain the desired statistical confidence that the estimated values are reliable.

Once the IR images have been acquired, the images are iteratively solved for the best azimuth X and elevation Y angular positions for the target blur spot, at block 1004.

The POF algorithm iteratively determines the best sub-pixel row i and columns j by minimizing the sum of the squared residuals (SOS) function, at block 1006. The sub-pixel row i and column j coordinates are termed "best" when the SOS function is at a global minimum. Once the "best" row i and column j positions are determined, the blur spot's amplitude for the "best" position is reported, at block 1008.

The amplitude of the infrared object may then be transmitted to a band ratio analyzer, which calculates the temperature "T" of the emissive infrared object 202, at block 1010. In addition, the temperatures time rate of change "delta T" may also be calculated based on multiple IR images of the object 202.

The temperature measurements may then be transmitted to a temperature analyzer, at block 1012. The temperature analyzer analyzes the temperature T to determine additional characteristics of the IR object 202. The temperature analyzer ratios the object amplitudes extracted from the POF algorithm in 2 or more infrared sensor bands. The ratio of the amplitudes cancels out the unknown range to the object. If the path transmittances are similar, the spectral response of the detectors are known. This dual band amplitude ratio is a temperature dependent Planck radiance ratio, and the temperature is analyzed (extracted) by matching the POF amplitude measurement ratio to the Planck radiance ratio. For an emissive object, the Planck radiance ratio is $[1/La^5/(exp(c2/La/T)-1)]/[1/Lb^5/(exp(c2/Lb/T)-1]$ where La and Lb are the wavelengths in cm units of the 2 infrared bands where the POF amplitude ratio is taken, c2 is a known radiation constant=1.4388 cm*Kelvin and T is the temperature in Kelvin. Thus, T the ratio temperature is determined when the POF amplitude ratio=the Planck radiance ratio. The presence of reflective emission requires more complex 3 band EAT algorithms.

Although the analytical methods and devices for determining the amplitude and position of infrared objects have been described in language specific to certain features and methods, it is to be understood that the features defined in the appended claims are not limited to the specific features and methods described. Rather the specific features and methods are disclosed as illustrative forms of implementing the claimed subject matter.

What is claimed is:

1. A system comprising an infrared sensor; and a processor programmed to process multiple frames of image data captured by the sensor, wherein the processor is programmed to estimate a centroid of a blur spot target in each of the frames; and separately estimate radiometric amplitude of the blur spot target in each of the frames according to an expression $$A1(X1, Y1, f) := \frac{\sum_{i=1}^{bed}\sum_{j=1}^{bed} (vectordata_f)_{i,j} \cdot F1x(i, X1) \cdot F1y(j, Y1)}{\sum_{i=1}^{bed}\sum_{j=1}^{bed} F1x(i, X1) \cdot F1y(j, Y1) \cdot (F1x(i, X1) \cdot F1y(j, Y1))}$$

where A1(X1,Y1,f) is the radiometric amplitude, X1 and Y1 are subpixel estimates of the centroid, F1x and F1y are a point spread function in row and column pixels, vectordata is the image data in i and j sensor coordinates, bed indicates that pixels are summed over a region in the image data, and f denotes the multiple frames that are statistically analyzed to produce mean and standard deviation for the amplitude and coordinates.

2. The system of claim 1, wherein the processor is further programmed to iteratively determine the estimates X1 and Y1 minimizing a sum of squares residuals function of the radiometric amplitude A1(X1,Y1,f).

3. The system of claim 2, wherein the sum of squares residual function SOS(X1,Y1,f) is computed as $$SOS(X1, Y1, f) := \sum_{i=1}^{bed}\sum_{j=1}^{bed} [(vectordata_f)_{i,j} - A1(X1, Y1, f) \cdot F1x(i, X1) \cdot F1y(j, Y1)]^2.$$

4. The system of claim 1, wherein a Monte Carlo method is performed as part of the statistical analysis.

5. The system of claim 1, wherein the statistical analysis is used to evaluate sensor noise and line of sight jitter on the estimated amplitude and centroid.

6. The system of claim 1, wherein the processor is further programmed to iteratively update the estimates X1 and Y1 according to a residual between the blur spot target in the frames and a modeled response of a source at a previously estimated centroid and amplitude.

7. A method comprising:
using an infrared sensor to provide a plurality of images containing an object;
using a processor to estimate a centroid of a blur spot target in each of the images; and
using the processor to separately estimate radiometric amplitude of the blur spot target in each of the images as a function of the estimated centroid and a statistical analysis of the images; wherein the amplitude is estimated according to an expression $$A1(X1, Y1, f) := \frac{\sum_{i=1}^{bed}\sum_{j=1}^{bed} (vectordata_f)_{i,j} \cdot F1x(i, X1) \cdot F1y(j, Y1)}{\sum_{i=1}^{bed}\sum_{j=1}^{bed} F1x(i, X1) \cdot F1y(j, Y1) \cdot (F1x(i, X1) \cdot F1y(j, Y1))}$$

where A1(X1,Y1,f) is the radiometric amplitude, X1 and Y1 are subpixel estimates of the centroid, F1x and F1y are a point spread function in row and column pixels, and vectordata is raw image data in i and j sensor coordinates, bed indicates that pixels are summed over a region in the image data, and f denotes the plurality of images that are statistically analyzed to produce mean and standard deviation for the amplitude and coordinates.

8. The method of claim 7, wherein the processor is further programmed to iteratively determine the estimates X1 and Y1 by minimizing a sum of squares residuals function of the radiometric amplitude A1(X1,Y1,f).

9. The method of claim 8, wherein the sum of squares residual function SOS(X1,Y1,f) is computed as $$SOS(X1, Y1, f) := \sum_{i=1}^{bed}\sum_{j=1}^{bed} [(vectordata_f)_{i,j} - A1(X1, Y1, f) \cdot F1x(i, X1) \cdot F1y(j, Y1)]^2.$$

10. The method of claim 7, wherein a Monte Carlo method is performed as part of the statistical analysis.

11. The method of claim 7, wherein the statistical analysis is used to evaluate sensor noise and line of sight jitter on the estimated amplitude and centroid.

12. The method of claim 7, wherein the processor is further used to iteratively update the estimates X1 and Y1 according to a residual between the blur spot target in the images and a modeled response of a source at a previously estimated centroid and amplitude.

13. An article comprising non-transitory computer readable memory encoded with code that, when executed, causes a computer to:
estimate a centroid of a blur spot target in each of a plurality of images;
separately estimate radiometric amplitude of the blur spot target in each of the images as a function of the estimated centroid and a statistical analysis of the images according to an expression $$A1(X1, Y1, f) := \frac{\sum_{i=1}^{bed}\sum_{j=1}^{bed} (vectordata_f)_{i,j} \cdot F1x(i, X1) \cdot F1y(j, Y1)}{\sum_{i=1}^{bed}\sum_{j=1}^{bed} F1x(i, X1) \cdot F1y(j, Y1) \cdot (F1x(i, X1) \cdot F1y(j, Y1))}$$

where A1(X1,Y1,f) is the radiometric amplitude, X1 and Y1 are subpixel estimates of the centroid, F1x and F1y are a point spread function in row and column pixels, vectordata is raw image data in i and j sensor coordinates, bed indicates that pixels are summed over a region in the image data, and f denotes the plurality of images that are statistically analyzed to produce mean and standard deviation for the amplitude and coordinates; and
iteratively updating the estimates X1 and Y1.

14. The article of claim 13, wherein a Monte Carlo method is performed as part of the statistical analysis.

15. The article of claim 13, wherein the statistical analysis is used to evaluate sensor noise and line of sight jitter on the estimated amplitude and centroid.

16. The article of claim 13, wherein the estimates X1 and Y1 are iteratively updated according to a residual between the blur spot target in the images and a modeled response of a source at a previously estimated centroid and amplitude.

17. The article of claim 13, wherein the code, when executed, causes the computer to iteratively determine the estimates X1 and Y1 by minimizing a sum of squares residual function of the radiometric amplitude A1(X1,Y1,f).

18. The article of claim 17, wherein the sum of squares residual function SOS(X1,Y1,f) is computed as $$SOS(X1, Y1, f) :=$$

$$\sum_{i=1}^{bed} \sum_{j=1}^{bed} \left[ (vectordata_f)_{i,j} - A1(X1, Y1, f) \cdot F1x(i, X1) \cdot F1y(j, Y1) \right]^2. \quad 5$$

\* \* \* \* \*